United States Patent
Wolf

(10) Patent No.: US 9,283,999 B2
(45) Date of Patent: Mar. 15, 2016

(54) MOTOR VEHICLE WITH A REAR DIFFUSER

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/298,150

(22) Filed: Jun. 6, 2014

(65) Prior Publication Data
US 2015/0353148 A1 Dec. 10, 2015

(30) Foreign Application Priority Data
Jun. 6, 2013 (DE) .......................... 10 2013 105 842

(51) Int. Cl.
*B62D 35/02* (2006.01)
*B62D 35/00* (2006.01)

(52) U.S. Cl.
CPC .............. *B62D 35/02* (2013.01); *B62D 35/007* (2013.01)

(58) Field of Classification Search
CPC ............................... B62D 35/02; B62D 35/007
See application file for complete search history.

(56) References Cited

U.S. PATENT DOCUMENTS

| | | | |
|---|---|---|---|
| 4,772,062 A | 9/1988 | Janssen et al. | |
| 7,717,494 B2 | 5/2010 | Nagahama | |
| 2013/0026797 A1* | 1/2013 | Onodera et al. | 296/204 |
| 2014/0070563 A1* | 3/2014 | Kurata | 296/180.1 |

FOREIGN PATENT DOCUMENTS

| | | |
|---|---|---|
| DE | 30 11 652 A1 | 10/1981 |
| JP | 8-5111 | 2/1996 |

OTHER PUBLICATIONS

German Search Report of Feb. 24, 2014.

* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A diffuser is arranged at the rear of a vehicle in the region of the underbody and has a fixed front part and an adjoining, pivotable rear part. Negative and positive lift effects and aerodynamic drag effects are obtained by adjusting pivotable rear part between an upwardly pivoted position and a downwardly pivoted position.

11 Claims, 2 Drawing Sheets

MOTOR VEHICLE WITH A REAR DIFFUSER

CROSS REFERENCE TO RELATED APPLICATION

This application claims priority under 35 USC 119 to German Patent Appl. No. 10 2013 105 842.6 filed on Jun. 6, 2013, the entire disclosure of which is incorporated herein by reference.

BACKGROUND

1. Field of the Invention

The invention relates to a motor vehicle with a rear diffuser.

2. Description of the Related Art

DE 11 2006 000 902 T5 discloses an aerodynamic element on the lower side of a vehicle body in the region of a rear of a vehicle. The angle of the aerodynamic element can be changed with respect to a carriageway surface. Thus, the aerodynamic element exerts a force on the vehicle by means of an air flow that flows on the lower side of the vehicle.

It is an object of the invention to provide a motor vehicle with a diffuser on the rear region of the vehicle wherein the diffuser can influence the driving performance of the motor vehicle with respect to a vehicle lifting effect and the aerodynamic drag.

SUMMARY OF THE INVENTION

The invention relates to a diffuser arranged on the underbody in the rear region of the vehicle. The diffuser is configured and operative to intervene actively in the driving performance of the vehicle. More particularly, an end region of the underbody at the vehicle rear has a diffuser with a positionally fixed front part and a movable rear part that adjoins the positionally fixed front part of the diffuser. The rear part of the diffuser has a surface rising in an upwardly folded operative position.

The rear part of the diffuser can be pivoted about a transversely running, positionally fixed axis of rotation from the upwardly pivoted operative position down toward the ground contact area of the vehicle into at least one further operative position. In the unfolded operative position, the pivotable rear part of the diffuser is at a reflex angle with respect to the positionally fixed front part of the diffuser.

The diffuser preferably extends from the rear axle of the vehicle to a rear part of the vehicle and comprises at least part of the underbody. More particularly, the positionally fixed front part of the diffuser is oriented substantially horizontally and the pivotable rear part defines part of the underbody that rises continuously to the lower edge of the rear part of the vehicle in the upwardly pivoted operative position of the diffuser.

This arrangement combined with the adjustability of the rear part of the diffuser enables a negative lift force to be controlled and can reduce the aerodynamic drag. The positive lift force is increased at the downwardly pivoted position of the rear part of the diffuser. However, the aerodynamic drag drops in relation to the operative position with the upwardly pivoted rear part of the diffuser. The pivotable rear part of the diffuser can be adjusted in a simple manner, with the required space needed being small.

The axis of rotation of the pivotable rear part of the diffuser preferably is arranged at a position approximately ⅓ of the diffuser length, and hence the pivotable rear part of the diffuser defines a length of approximately ⅔ of the total length of the diffuser. The total length of the diffuser preferably is approximately 300 mm. In the upwardly folded operative position, the movable diffuser end part is arranged at an angle of about ≥25° with respect to a horizontal. In the downwardly unfolded operative position, the movable diffuser end part is arranged at an angle of approximately 5° with respect to the horizontal or horizontally with respect to the carriageway contact area. The position of the axis of rotation with respect to the length of the diffuser results in an optimum effect of the diffuser with respect of the negative lift forces and the aerodynamic drag, and is controlled by the angular position of the rear part of the diffuser.

The movable rear part of the diffuser can be formed from the rear covering of the underbody and, in the upwardly pivoted operative position is flush with the covering. However, the diffuser end part may be a separate part that is fit onto the underbody and, in the upwardly pivoted operative position, is flush against the rear covering or against the underbody.

The rear edge of the movable rear part of the diffuser preferably is connected to the vehicle rear by an elastic closure part or an expansion bellows. The expansion bellows is not visible in the upwardly folded operative position.

The diffuser end part may be actuated electrically or pneumatically by an adjustment mechanism into the operative and intermediate positions. The adjustment mechanism can be actuated via a control element depending on the current driving state.

The diffuser end part can be activated so that the diffuser end part is adjusted into the different operative positions at different speeds and from different speeds so that a coordinated negative lift and the aerodynamic drag can be correspondingly set.

An exemplary embodiment of the invention is illustrated in the drawings and is described in more detail below.

DETAILED DESCRIPTION OF THE PREFERRED EMBODIMENTS

Figure 1:
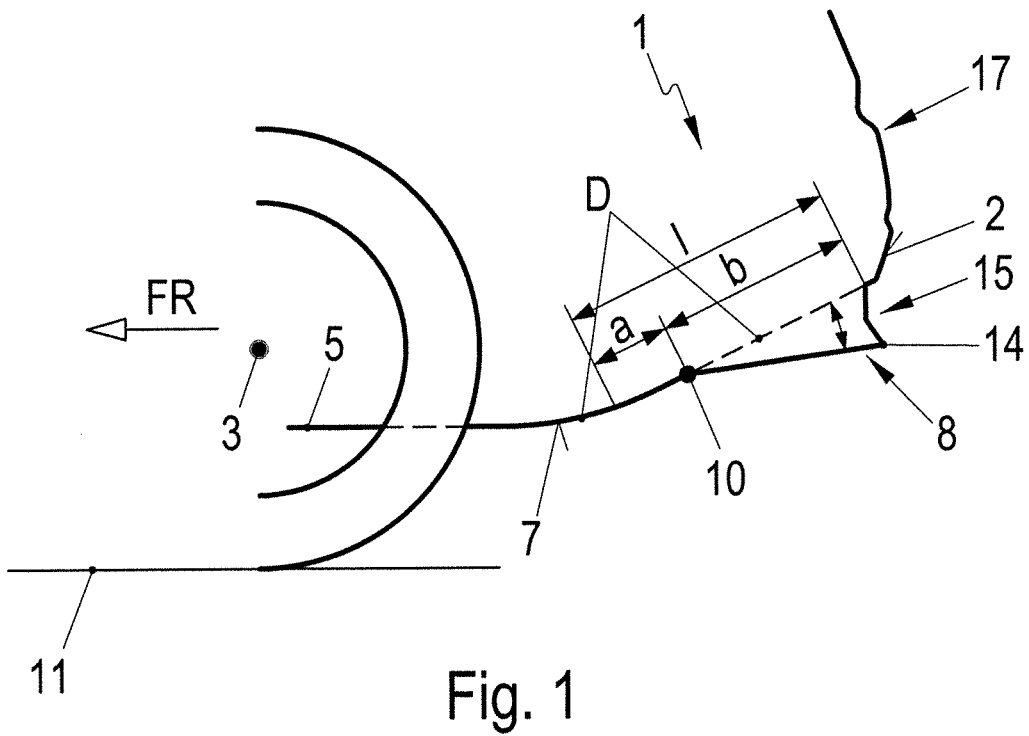
FIG. 1 is a schematic illustration of a rear of a vehicle with the underbody of the vehicle including a diffuser that has a positionally fixed front part and a pivotable rear part.

A motor vehicle 1 has a rear region 2 with a diffuser D on the underbody 5 from a rear axle 3 for rear wheels 12 to a lower edge 4 of the rear region 2. The diffuser has a diffuser surface 9 that rises rearward and counter to the direction of travel FR.

The diffuser D is arranged on the end region 6 of the underbody 5 at the vehicle rear 17 and includes a positionally fixed front part 7 and a pivotable rear part 8 that adjoins the rear end of front part 7 of the diffuser D, as seen with respect to the direction of travel FR. The rear part 8 of the diffuser D has the diffuser surface 9 that rises in an upwardly folded operative position I. However, the rear part 8 of the diffuser is pivotable via a transversely running, positionally fixed axis of rotation 10, from the upwardly pivoted operative position I down toward the ground contact area of the vehicle 11 into at least one lower, unfolded operative position II. In the position II, the diffuser end part 8 is at a reflex angle α with respect to the positionally fixed diffuser part 7.

A negative lift effect on the vehicle 1 can be produced by the upwardly folded-in operative position I of the movable diffuser end part 8 and a reduced aerodynamic drag effect can be produced by the downwardly unfolded operative position II. A combined effect of negative lift force/positive lift force and aerodynamic drag is possible in positions between the operative positions I and II.

The diffuser D is formed by the underbody 5 on the end region 6 of the vehicle rear H and comprises a rising underbody 5 from the rear axle 3 of the vehicle 1 to the lower edge 4 of the rear part 2. The diffuser D has the positionally fixed front part 7 of the underbody 5, that is oriented approximately in a horizontal plane and to which the movable rear part 8 of the underbody 5 is connected. The rear part 8 rises continuously toward the lower edge 4 of the rear part 2 when in the upwardly folded operative position I. The diffuser end part 8 also can be a separate element and, rather than consisting of the underbody, may be fit onto the underbody 5.

The axis of rotation 10 of the rear part 8 preferably is at a position approximately ⅓ of the length of the upwardly sloped part of the diffuser D measured from the front end of the upwardly sloped part of the diffuser D so that a length a of the positionally fixed front part 7 is ⅓ of a length I of the diffuser D and a length b of the movable rear part 8 of the diffuser D defines about ⅔ of the length I of the upwardly sloped part of the diffuser D. The length of the diffuser is approximately c=300 mm.

In the upwardly pivoted operative position I, the pivotable rear part 8 preferably is at an angle $\beta \geq 25°$ to a horizontal x-x. In the downwardly pivoted operative position II, the movable rear part 8 preferably is at an angle $\gamma$ of approximately 5° with respect to the horizontal x-x or with respect to the ground contact area of the vehicle 11.

A rear edge 14 of the pivotable rear part 8 is connected to the vehicle rear H by an elastic closure element, such as an expansion bellows, so that the free surface between the rear edge 14 and the vehicle rear H is closed. The expansion bellows 15 is no longer visible in the upwardly folded position I.

Figure 2:
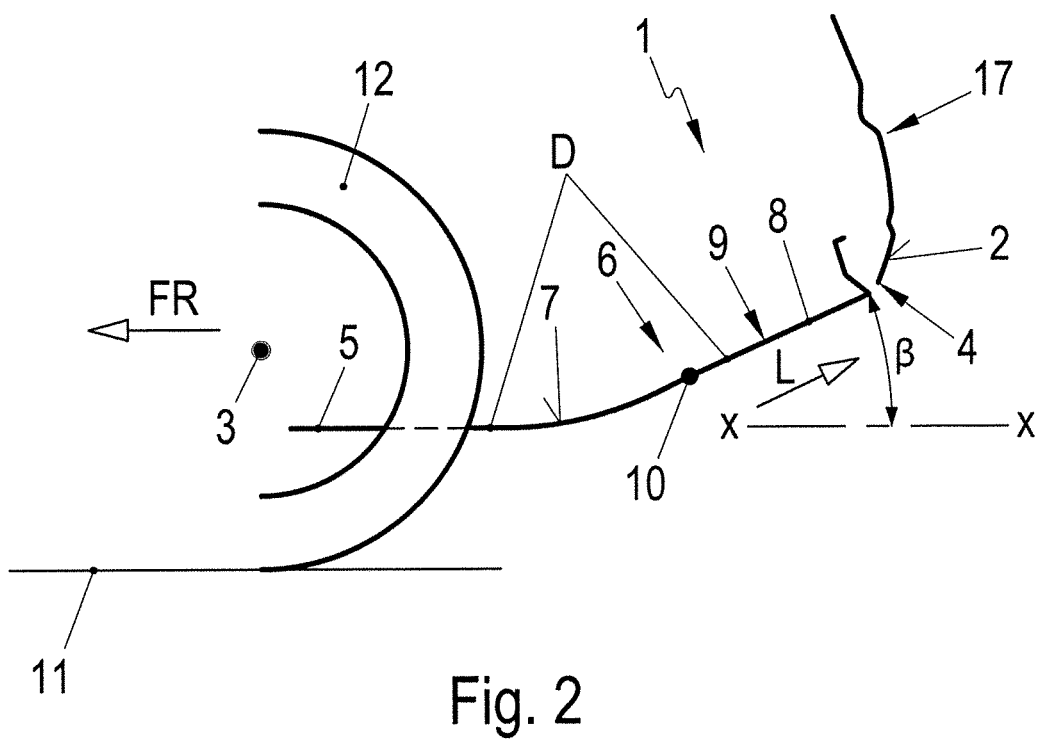
FIG. 2 is a side view of the vehicle rear with the rear part of the diffuser in an upwardly folded first operative position.
Figure 3:
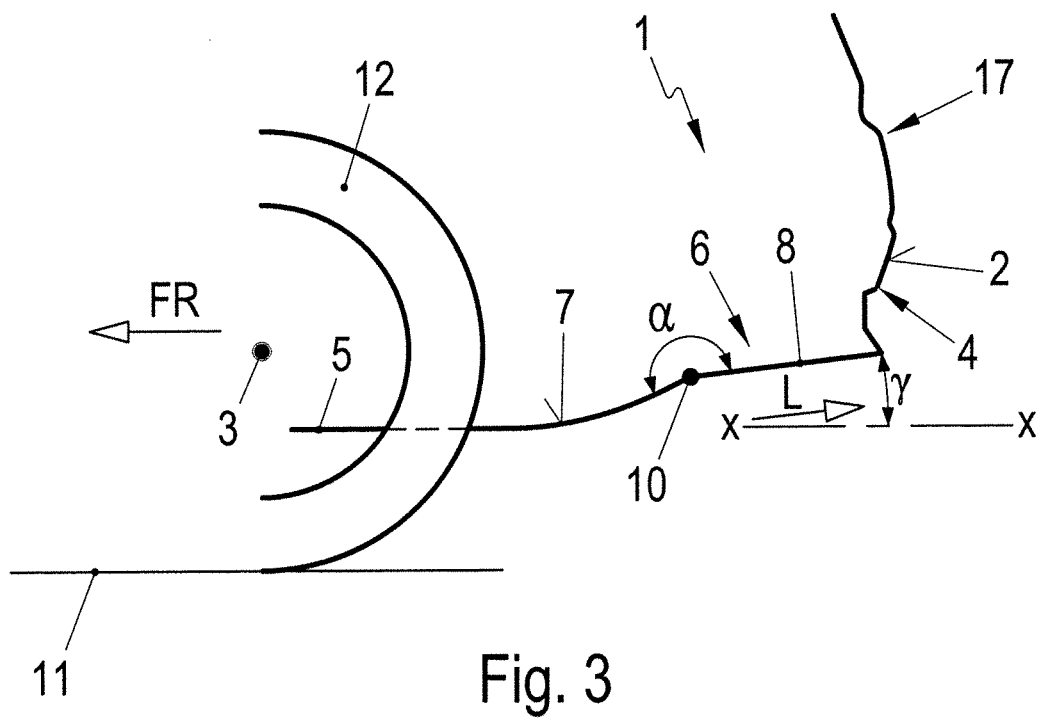
FIG. 3 is a side view of the vehicle rear with the rear part of the diffuser in a downwardly folded second operative position.
Figure 4:
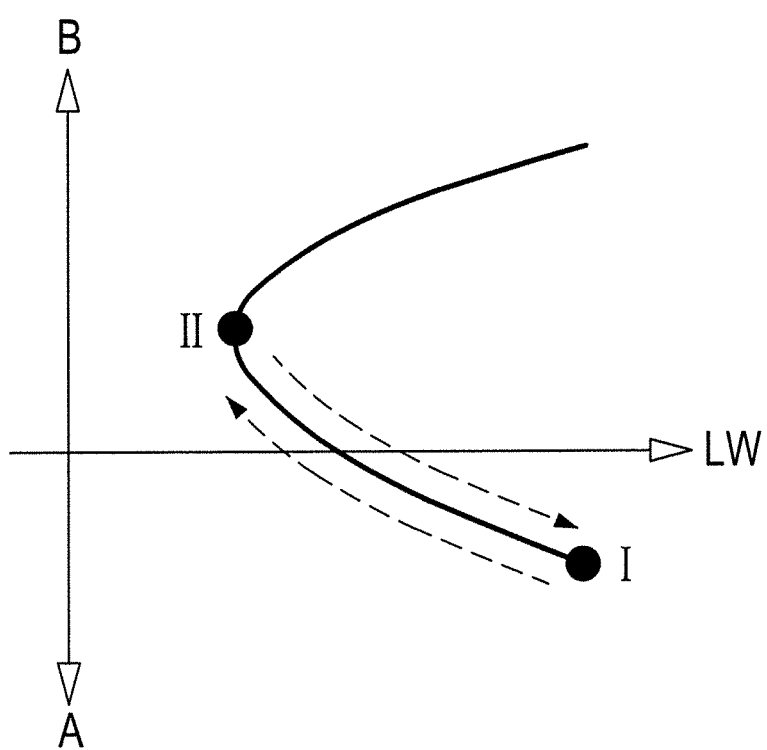
FIG. 4 is a polar diagram depicting the two operative positions of the rear diffuser end part in relation to the positive/negative lift and aerodynamic drag.

As illustrated in the polar diagram of FIG. 4, a negative lift force A and an aerodynamic drag LW are achieved by the air flow L along the rising diffuser surface 9 (FIG. 3) of the upwardly folded rear part 8 in the operative position I (FIG. 2), but the aerodynamic drag LW is higher than the aerodynamic drag LW with the unfolded rear part 8 of the diffuser in the operative position II (FIG. 3). By contrast, the positive lift B at the rear axle 3 in this operative position II is greater than in the operative position I (FIG. 2).

The movable rear part 8 of the diffuser D can be activated so that the rear part 8 is in the upwardly folded operative position I during slow travel. The pivotable rear part 8 preferably is pivoted down into the operative position II from a speed of V1 of approximately 80 km/h. Below V1, the pivotable rear part 8 is folded into the operative position I. The rear part 8 is folded into the operative position I approximately from a speed of V2 of 200 km/h. The setting of the diffuser end part 8 may vary depending on the type of vehicle.

The pivotable rear part 8 of the diffuser D is designed to be foldable electrically or pneumatically by an adjustment mechanism 20 into the individual operative position I, II and intermediate positions.

What is claimed is:

1. A motor vehicle, comprising:
   an underbody extending rearward from a position in proximity to a rear axle of the vehicle in a substantially horizontal plane; and
   a diffuser extending rearward from the underbody and including:
      a positionally fixed front part having a front end connected to the underbody and a rear end spaced rearward from the front end, the positionally fixed front part of the diffuser being curved up from the front end to the rear end thereof, and
      a movable rear part pivotally connected to the rear end of the front part with a pivoting connection that prevents air flow on an upper side of the diffuser while permitting a pivoting movement about a transverse positionally fixed axis of rotation, the movable rear part being pivotable between an upwardly pivoted operative position where the movable rear part extends up from the positionally fixed front part and a downwardly operative position where the movable rear part of the diffuser is at a reflex angle with respect to the upwardly curved positionally fixed front part of the diffuser.

2. The motor vehicle of claim 1, wherein a length of the movable rear part is about ⅔ of a length of the diffuser.

3. The motor vehicle of claim 1, wherein, in the upwardly pivoted operative position, the movable rear part is at an angle of $\beta \geq 25°$ with respect to the horizontal plane.

4. The motor vehicle of claim 3, wherein, in the downwardly pivoted operative position, the movable rear part of the diffuser is at an angle $\gamma$ of approximately 5° with respect to the horizontal plane.

5. The motor vehicle of claim 1, wherein the movable rear part of the diffuser has a width approximately equal to an entire width between rear wheels of the vehicle.

6. The motor vehicle of claim 1, wherein the movable rear part of the diffuser is formed from the underbody and, in the upwardly pivoted operative position, runs flush with a covering of the vehicle.

7. The motor vehicle of claim 1, wherein a rear edge of the movable rear part of the diffuser is connected by an expansion bellows to the rear part of the vehicle, the expansion bellows being concealed and not visible in the upwardly pivoted operative position.

8. The motor vehicle of claim 1, further comprising an adjustment mechanism configured for moving the movable rear part of the diffuser folded electrically or pneumatically into the upwardly and downwardly pivoted operative positions and intermediate positions.

9. The motor vehicle of claim 1, wherein the movable rear part is in the upwardly pivoted operation position during slow travel; the rear part being pivoted down into the downwardly pivoted operative position from a first speed V1 of approximately 80 km/h, and is kept in the upwardly pivoted operative position below the first speed and is kept in the upwardly pivoted operative position from a speed of approximately 200 km/h.

10. The motor vehicle of claim 1, wherein a negative lift effect is produced by the upwardly pivoted operative position of the movable rear part and a reduced aerodynamic drag effect is produced by the downwardly unfolded operative position.

11. The motor vehicle of claim 1, wherein the movable rear part of the diffuser extends substantially tangentially up from the rear end of the upwardly curved positionally fixed front part of the diffuser when the rear part is in the upwardly pivoted operative position.

* * * * *